United States Patent [19]
Hunter et al.

[11] Patent Number: 5,934,833
[45] Date of Patent: Aug. 10, 1999

[54] VIBRATORY PIPE AND CABLE LAYING PLOW

[75] Inventors: Paul M. Hunter, Carlsbad, Calif.; Lemna J. Hunter, Albuquerque; Paul Ekegren, Edgewood, both of N.Mex.

[73] Assignee: Installation Systems, A California Limited Liability Company, Carlsbad, Calif.

[21] Appl. No.: 08/706,785

[22] Filed: Sep. 3, 1996

[51] Int. Cl.[6] .................................. H02G 1/06; E02F 5/10
[52] U.S. Cl. .............................. 405/180; 405/183; 37/367
[58] Field of Search .................................. 405/180, 183; 37/367, 379, 380

[56] References Cited

U.S. PATENT DOCUMENTS

| | | | |
|---|---|---|---|
| 3,326,009 | 6/1967 | Gagne | 405/182 |
| 3,326,010 | 6/1967 | Gagne | 405/182 |
| 3,421,329 | 1/1969 | Kinnan | 405/182 |
| 3,685,591 | 8/1972 | Ulrich et al. | 172/40 |
| 3,952,810 | 4/1976 | Ulrich | 172/40 |
| 4,506,740 | 3/1985 | Carter | 172/40 |
| 4,685,832 | 8/1987 | Decker | 405/184 |
| 5,108,229 | 4/1992 | Slanker | 405/181 |

*Primary Examiner*—Tamara L. Graysay
*Assistant Examiner*—Tara L. Mayo
*Attorney, Agent, or Firm*—Paul Adams; Jeffrey D. Myers

[57] ABSTRACT

A self-propelled, and winch assisted, steerable vibratory plow for laying underground pipe or cable, having a V-shaped blade connected to an oscillator which provides both elliptical and horizontal plow blade motion as needed, and with auxiliary straight blade plows for laying lateral lines on the sides of the main line. The main plow's gasoline engine powers a hydraulic system which powers the winch and a transaxle connected to the forward drive wheels, and powers the oscillator and a steering cylinder, as well as powering a hydraulic cylinder for lowering and raising the plow blade.

6 Claims, 7 Drawing Sheets

VIBRATORY PIPE AND CABLE LAYING PLOW

BACKGROUND OF THE INVENTION

The present invention pertains to vibratory plows useful in laying of underground pipe or electrical cable, and in particular to such a machine having an advantageous combination of features not found in previous vibratory plow machines known to the applicants. This type of machine uses a vibrating blade to make a cut through the ground, through which cut a pipe or cable is pulled and laid behind the advancing blade, without the need for digging a trench from which the soil is removed.

There are numerous applications in which it is necessary to lay underground water pipe or electrical cable, including, for example, the installation of sprinkler systems and cable TV systems. In many residential neighborhoods it is desirable, or even required by neighborhood building restrictions, to have all electrical power and cable TV cable installed underground. It is desirable for such applications, to have a self-powered machine which is capable of inserting the pipe or cable within the ground, without the labor-intensive, expensive and slower alternative of trench digging.

In such applications it is sometimes necessary to have such a machine which can also pull auxiliary plows, which are capable of laying auxiliary lines of pipe or cable, branching off from the main line. And it is desirable to have such a machine which can pull and lay the main line of pipe or cable, and any auxiliary plows and lines, in the same operation. In some such operations, very large pulling power may be required, in order for the main plow to be able to speedily pull all of the pipe or cable line material, and any auxiliary plows, as well as overcoming the soil resistance, which may be quite considerable in hard ground. Although such objectives could be accomplished by use of a main plow machine which is not only adequately powered, but also large and massive, as has sometimes been done in the past, it is desirable to have such a machine which is able to accomplish these objectives, while yet being relatively small and light weight. Use of a relatively small machine facilitates working in close quarters, which is sometimes necessary, particularly in some residential operations. And use of a relatively light weight plow machine is more conducive to minimizing landscape damage, and to ease of loading and unloading the machine on a vehicle for transporting the machine to and from a job site.

Depending upon the soil conditions, as well as on the total weight of pipe or cable and any auxiliary plows being pulled by the main plow machine during the pipe or cable laying operation, both of which may vary considerably from one such project to another, it is also desirable to provide such a machine which is capable of providing not only a linear oscillation motion to the plow blade, but also provides the option of providing an elliptical motion instead, so as to provide greater flexibility for the operator in dealing with all such varied conditions which may be encountered in different projects of this type.

Although the documents exhibited with applicants' information disclosure statement disclose prior machines having particular elements or features which are the same or similar to particular elements of applicants' invention, the applicants' invention accomplishes the purposes and provides the advantages discussed above, by providing the following combination of elements not disclosed in any prior plow machine known to applicants: a V-shaped plow blade configuration; a winch which may be secured to a fixed object ahead of the machine, for provision of greater pulling power, obviating any need for a large, massive plow machine; and a blade oscillator having the capability of allowing the operator to select either linear or elliptical motion for the blade oscillation.

SUMMARY OF THE INVENTION

The invention is a self-propelled but also winch assisted vibratory plow, for laying underground pipe or cable, having a winch with a winch cable which may be secured ahead of the machine, to provide enhanced pulling force when needed for the existing soil conditions or for laying larger pipe or cable, while also allowing use of a relatively small machine, and having an oscillator, connected to the plow blade, which can provide either elliptical or purely horizontal plow blade motion. The machine has a gasoline engine powering a multi-function hydraulic system powering five components: the winch; a transaxle attached to the forward drive wheels which move the entire machine forward; the oscillator (through a mechanical linkage); a steering cylinder, to allow the machine to be steered; and a blade extension hydraulic cylinder, to allow the blade to be pushed downward and raised from the machine. The direction of the plow is controlled by a steerable rear wheel, which is turned by turning of the entire trailer assembly. Both drive wheels are mounted to a lockable but disengageable free hub, which allows for freewheeling of that drive wheel to increase maneuverability. The blade may be a blade with a V-shaped configuration, for easier access to laid pipe or cable, and the winch provides the necessary pulling force to allow such a blade to be pulled through the soil. The blade is driven to the desired depth by the blade extension hydraulic cylinder. The machine includes an adjustment mechanism for adjusting the blade angle of attack. One embodiment includes one or more auxiliary plows for laying lateral lines, with the main plow serving as an anchor, and the auxiliary plows being pulled in toward the main machine; each auxiliary plow has its own straight blade, and oscillator.

DESCRIPTION OF THE PREFERRED EMBODIMENT

Figure 1:
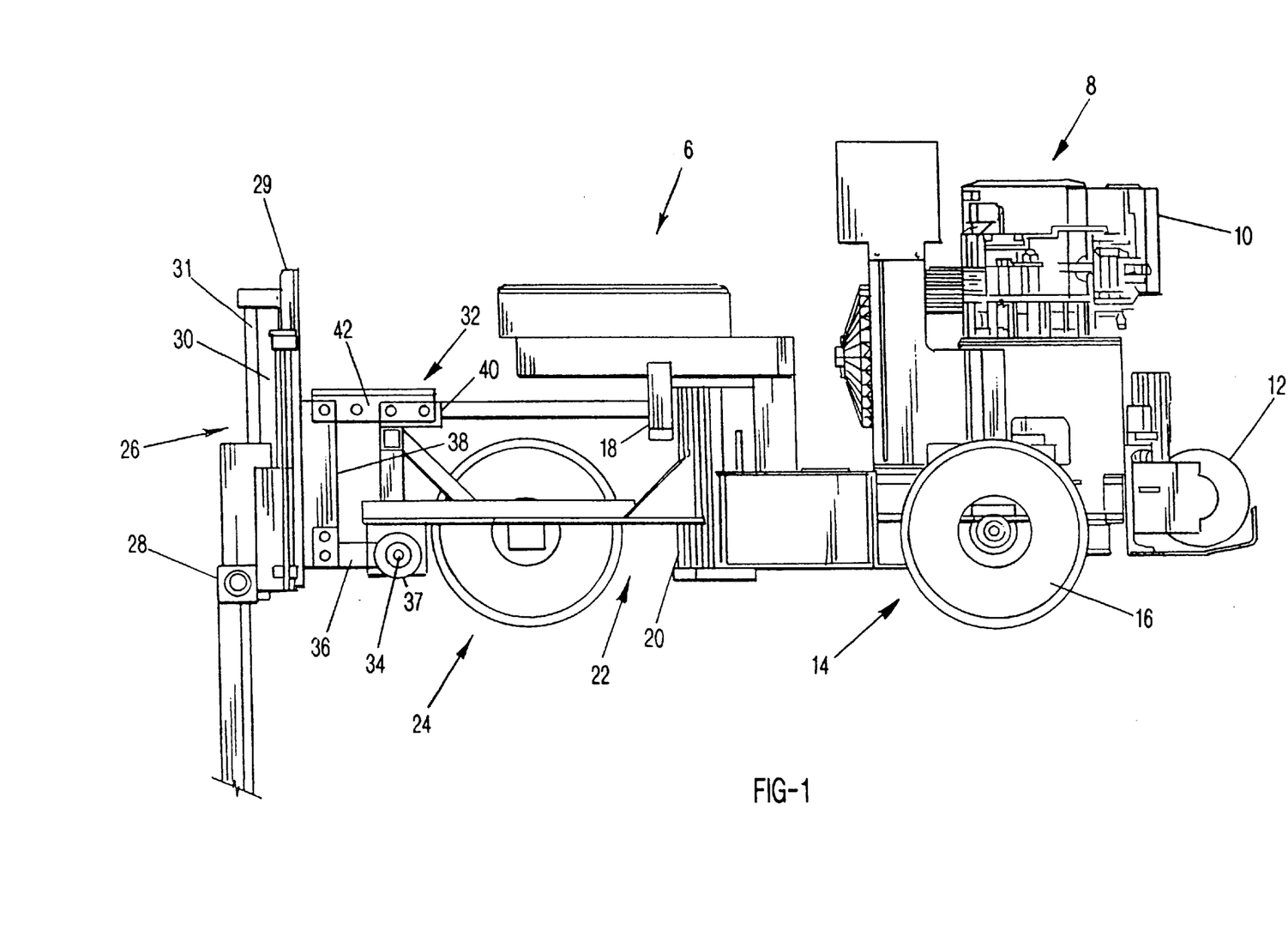
FIG. 1 is a side elevational view of the main machine of the preferred embodiment.
Figure 2:
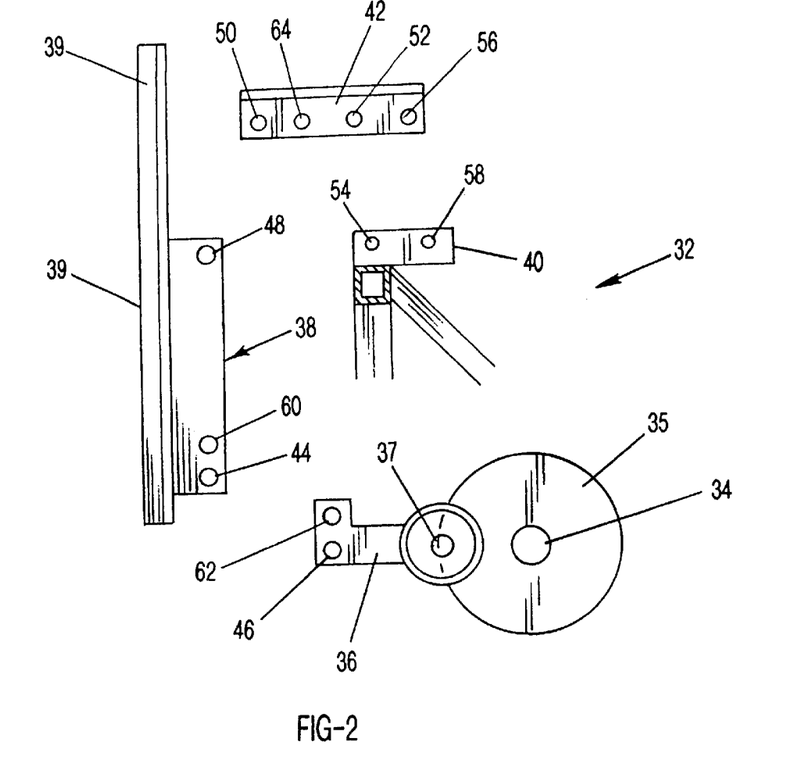
FIG. 2 is an exploded side elevation view of the connecting parts and pins used to select either elliptical or horizontal motion for the blade oscillation.
Figure 3:
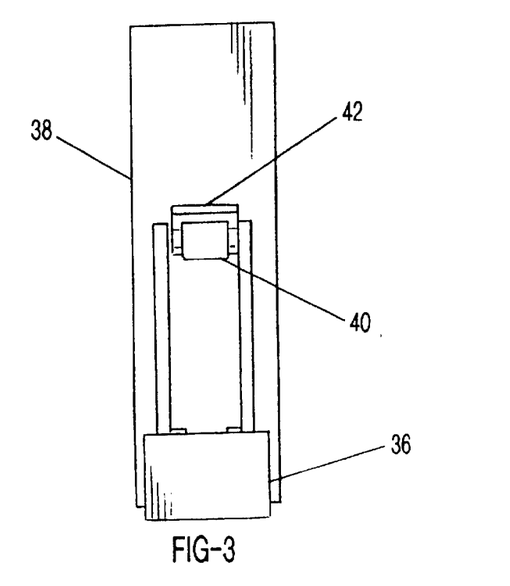
FIG. 3 is a front elevational view of the arrangement of the links used in controlling the nature of the blade oscillation.
Figure 4:
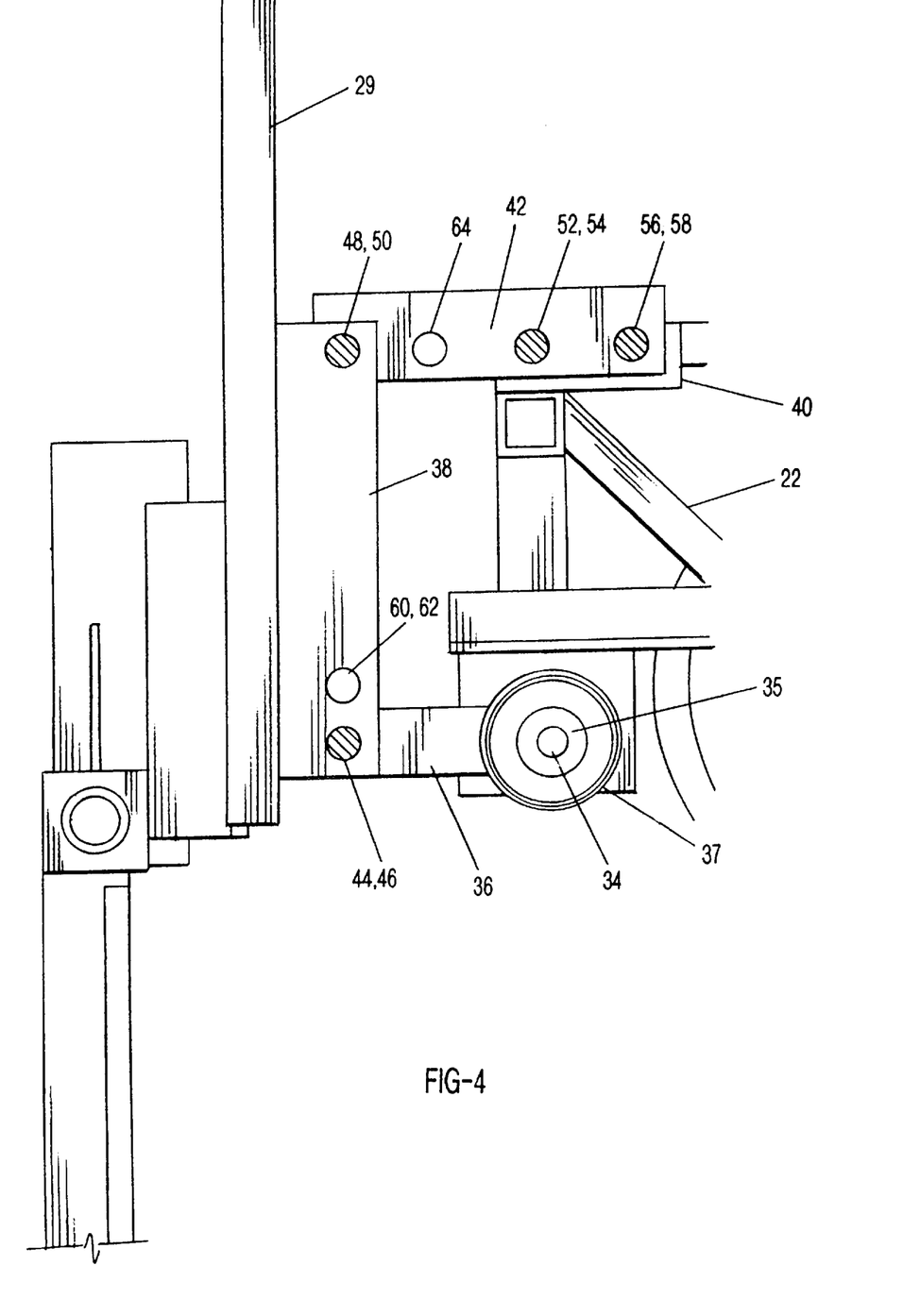
FIG. 4 is a detailed view of the oscillator means of the invention shown in the substantially horizontal oscillatory mode.

Referring now to the drawings, in which like reference numbers denote like or corresponding elements, the principal components of the vibratory plow machine 6 comprises a forward tractor chassis 8 on which is mounted a gasoline engine 10, which powers the hydraulic system that in turn powers all of the moving components of machine 6; a winch 12, mounted on chassis 8 and powered by engine 10 has a cable (not shown) which may be secured to a fixed object ahead of the machine path, for providing additional pulling power. Chassis 8 includes a transaxle and forward drive wheel assembly 14 having two drive wheels 16, powered by engine 10 to move the machine forward. A steering cylinder 18 and a steering kingpin assembly 20 are used to steer the direction of travel of the machine 6. A trailer chassis 22 connected through king pin assembly 20 at the rear of the tractor chassis 8 to which plow means 26 and related components are connected, with trailer chassis 22 being mounted on trailer wheels 24.

Figure 6:
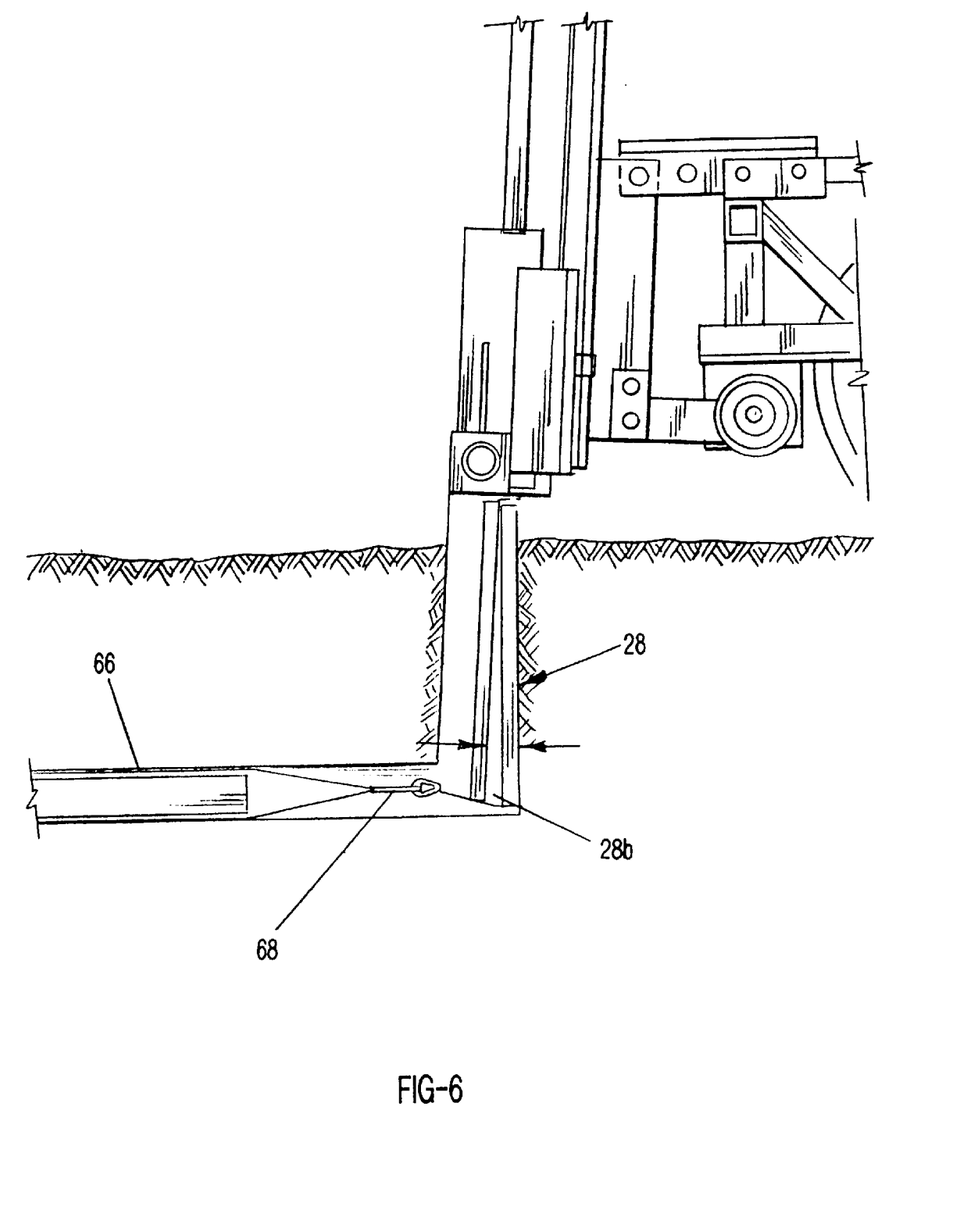
FIG. 6 is a side sectional view of the plow blade of the preferred embodiment, inserted in the ground.
Figure 7:
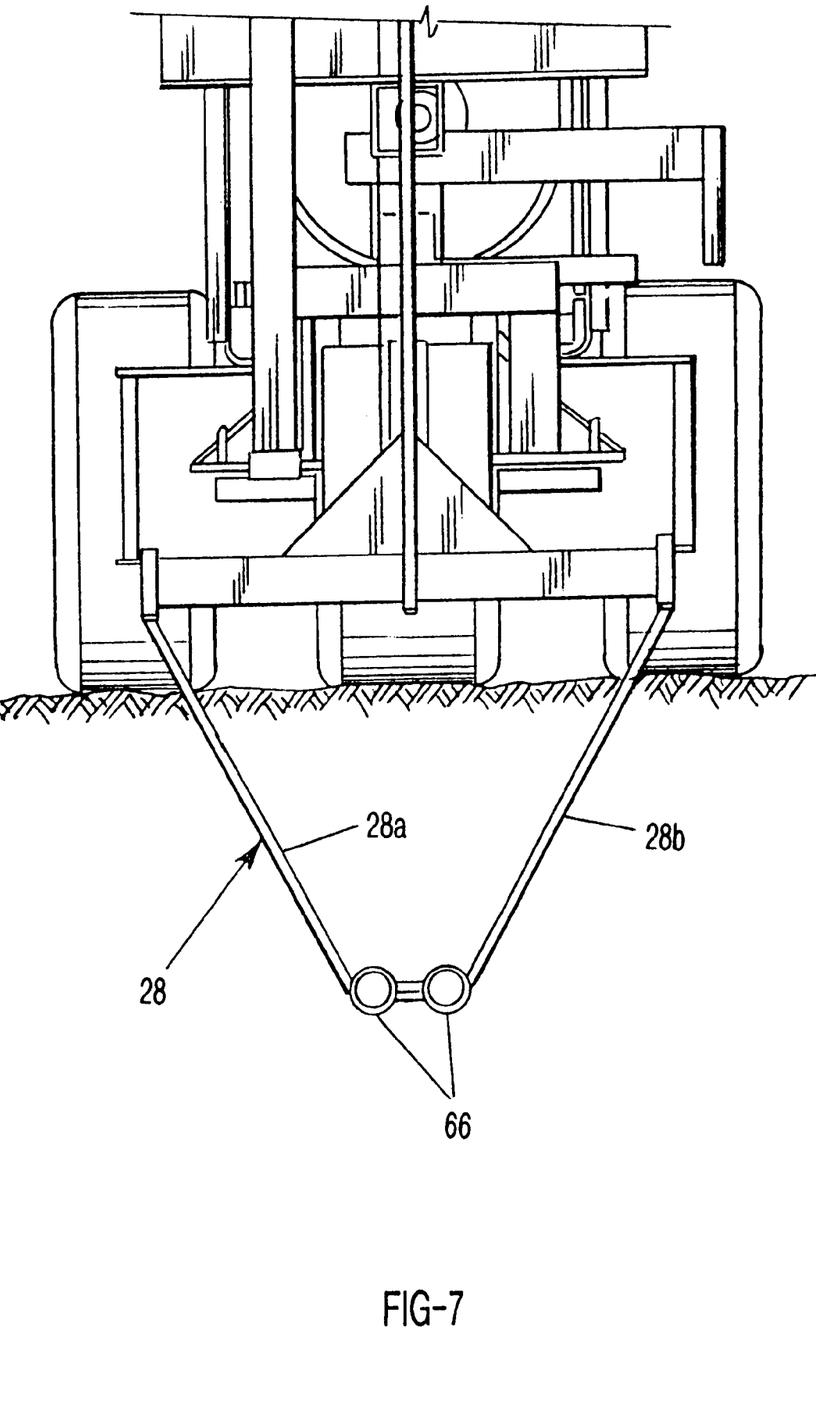
FIG. 7 is a rear view of the plow blade of FIG. 4, inserted in the ground, showing the V-shaped configuration of the plow blade.

In the preferred embodiment, plow means 26 comprises a plow blade 28, having two blades 28a and 28b, disposed in planes at an angle to the ground and joined to form a V-shaped configuration with the junction of the V downward, and with a cutting edge of the blade 28 facing forward, in the intended direction of travel of the machine. A blade extension cylinder 30 is connected to the plow blade 28 through vertical member 29 and arm 31 and to the trailer chassis 22 in the manner detailed below and is used to lower and raise plow blade 28 at the start and completion of each pipe or cable laying operation. Oscillator means 32, further detailed and described below, is mounted on the rear of trailer chassis 22 and is used to control oscillation of the plow blade 28.

Oscillator means 32 has an oscillator shaft 34, driven by an hydraulic assembly (not shown) powered by engine 10, is rigidly mounted on the lower rear portion of the trailer chassis 22.

Referring now to FIGS. 2 through 5, the oscillator means 32 includes the rotatable hydraulically-driven shaft 34 and a wheel 35 mounted fixedly on shaft 34 and rotating together therewith to which is attached is the oscillator linkage assembly. The oscillator linkage assembly comprises a first link 38 fixedly mounted to member 39. A second link 36 is mounted through a pivot axle 37 which is mounted on wheel 35. The third link 42 completes the linkage assembly of oscillating means 32. Link 36 has a pair of openings 46 and 62 at the end opposite the pivot shaft 37. First link 38, which is vertically oriented, has openings 44 and 60 at its lower end and 48 at its upper end. Third link 42 has four holes 50, 64, 52, and 56. As explained in greater detail below, the chassis 22 includes means for mounting the third member 42 of the linkage assembly to the frame of chassis 22.

Oscillator means 32 imparts desired oscillation to the plow blade 28, through the linkage assembly comprising first line 38, second link 36, and third link 42. Oscillation is imparted through the second link 36, to the first link 38, which is attached to the 40 by the third link 42. The plow blade 28 is mounted on a cylinder 30 slide mounted on a rod 31 and can be raised or lowered by hydraulically operating cylinder 30.

The operator can select the oscillator assembly 32 to produce substantially elliptical or horizontal oscillation of plow blade 28, as desired.

The links 36, 38, and 42 and the frame 40 are interconnected by pivot means to effect the selection of the oscillatory movement. The pivot means between links one and two comprise the holes 60, 44, 62, and 46. Round attachment pins (not shown) are used to effect pivotal motion between links one and two. Specifically, when holes 60 and 62 are aligned and holes 44 and 46 are aligned, one pin may be inserted through either pair of holes to form a pivotal connection, or two pins may be inserted to form a fixed connection. At the upper end of the first link 38, the hole 48 may be aligned with hole 50 in the third link 42 and forms only a pivotal connection. This effected by placing a pin through the aligned holes 48 and 50. The third link 42 comprises the three holes 64, 52, and 56 in third link 42 and the two holes 54 and 58 in frame 40. Frame 40 and third link 42 are interconnected through pivot means comprising these holes. Specifically, any one of the three holes 64, 52, or 56 may be aligned with hole 54 or 58 and the corresponding pair of holes may be interconnected with a pin to for a pivotal connection. Alternatively, one pair of the holes 64, 52, and 56 may be aligned with the pair of holes 54 and 58 through which two pins may be inserted so as to form a non-pivotal connection between third link 42 and mount 40. It will be understood that the linkage assembly just described is duplicated at horizontally spaced apart locations so as to provide stability in the vertical-longitudinal plane In order to produce substantially horizontal oscillations, connecting pins are inserted through the indicated holes (shown as a closed or filled circle) in FIG. 4 in the linkage elements: a pin through hole 44 in oscillator blade mount link 38 and through hole 46 in second link 36; a pin through hole 48 in first link 38 and through hole 50 in third link 42; a pin through hole 52 in third link 42 and through hole 54 in block 40; a pin through hole 56 in third link 42 and through hole 58 in block 40.

Figure 5:
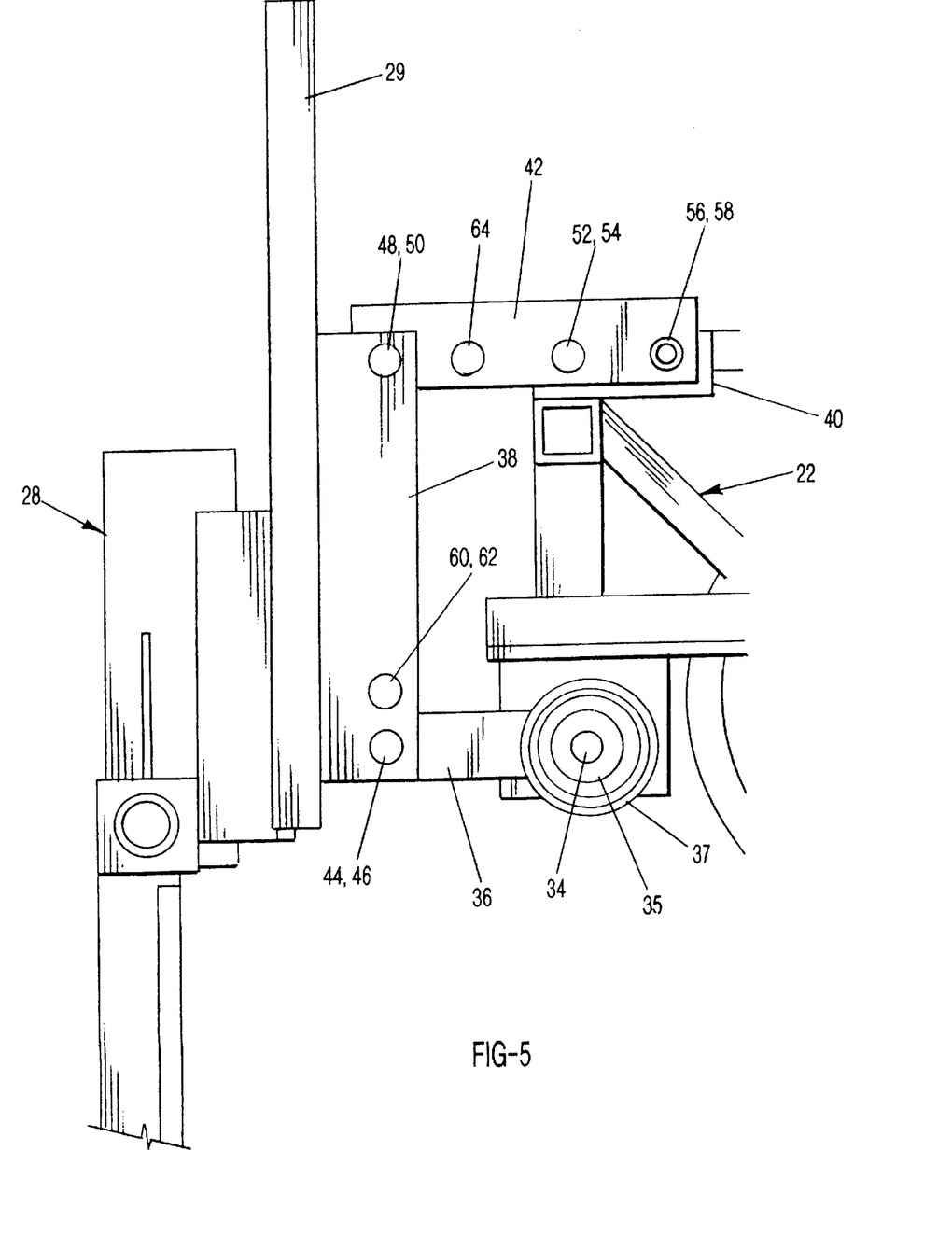
FIG. 5 is a detailed view of the oscillator means shown in FIG. 4 configured for operation in the substantially elliptical mode.

To produce substantially elliptical oscillations of plow blade 28, the connections of pins is as shown in FIG. 5 as follows: a pin through hole 44 in blade link 38 and through hole 46 in second link 36; a pin through hole 60 in first link 38 and through hole 62 in second link 36; a pin through hole 48 in first link 38 and through hole 50 in third link 42; and a pin through hole 52 in third link 42 and through hole 54 in frame block 40.

It is sometimes beneficial, when operating the plow blade 28 in the horizontal oscillation mode, to decrease the angle of the plow blade 28 relative to a vertical-transverse plane so that when a V-shaped configuration plow blade 28 is used, it allows the plow blade 28 to better cut into the ground when the blade has not yet reached the desired depth; after the desired depth is reached, the angle can be returned to vertical. This adjustment of the angle is done using the linkage of the oscillator means 32, with pins connected as follows: a pin through hole 44 in first link 38 and through holes 46 in second link 36; a pin through hole 48 in first link 38 and through hole 50 in third link 42; a pin through hole 64 in third link 42 and through hole 54 in block 40; and a pin through holes 52 in third link 42 and through hole 58 in block 40. This arrangement of pins provides for substantially horizontal oscillatory movement while the blade 28 upper end is angled toward tractor chassis 8.

The manner of operation of the machine is straightforward. The controls for the machine are conventional levers (not shown) controlling hydraulic fluid flows. The transaxle, oscillator shaft rotating motor, blade cylinder, winch, and steering cylinder are operated by hydraulic lever controls. The desired arrangement of the oscillator links must be made with the machine not running. After starting engine 10, the operator manipulates conventional variable speed controls (not shown) to engage the drive wheels 16, which are mounted to a lockable free hub, selectable by the operator, to allow for freewheeling of that drive wheel in order to increase maneuverability. The operator also manipulates the controls which engage and disengage the oscillator means;

attaches a plow blade 28 to the blade extension cylinder 30 and to the oscillator blade link 38, and also attaches the pipe or cable 66 to be laid, to plow blade 28 using an attachment device 68, which may be any of a number of commercially available devices designed for this purpose. The plow blade 28 is vertically slidable relative to the machine 6 through the blade cylinder 30 that is movable relative to the extension 39 attached to link 38. In this fashion the blade can be moved up and down relative to the first link 38, and therefore relative to the machine 6 in general. In this manner the plow blade 28 can be forced down into the ground, or pulled up out of the ground. After engaging the oscillator means, the operator engages the blade extension cylinder 30 to drive plow blade 28 to a desired depth, as the drive wheels 16 are engaged. The oscillation of plow blade 28 cuts the soil while the engine 10 and transaxle and forward drive wheel assembly 14 propel the machine forward.

The operator is able to steer the machine by use of the steering cylinder 18, which, in conjunction with the steering kingpin assembly 20, is used to change the relative angular orientation of trailer chassis 22 and tractor chassis 8 in order to steer; as already noted, the freewheeling feature of one of the drive wheels 16 also assists in steering maneuverability.

As the machine moves forward, the pipe or cable being pulled by the machine is automatically inserted within the ground behind the advancing plow blade 28, in the cut through the ground made by plow blade 28.

Where the soil conditions and/or weight of cable or pipe being pulled and laid are such that additional pulling force is required, the cable (not shown) from winch 12 can be secured to a fixed object ahead of the machine (e.g. a post driven securely into the ground), so that operation of the winch 12 can provide the additional pulling power required.

Figure 8:
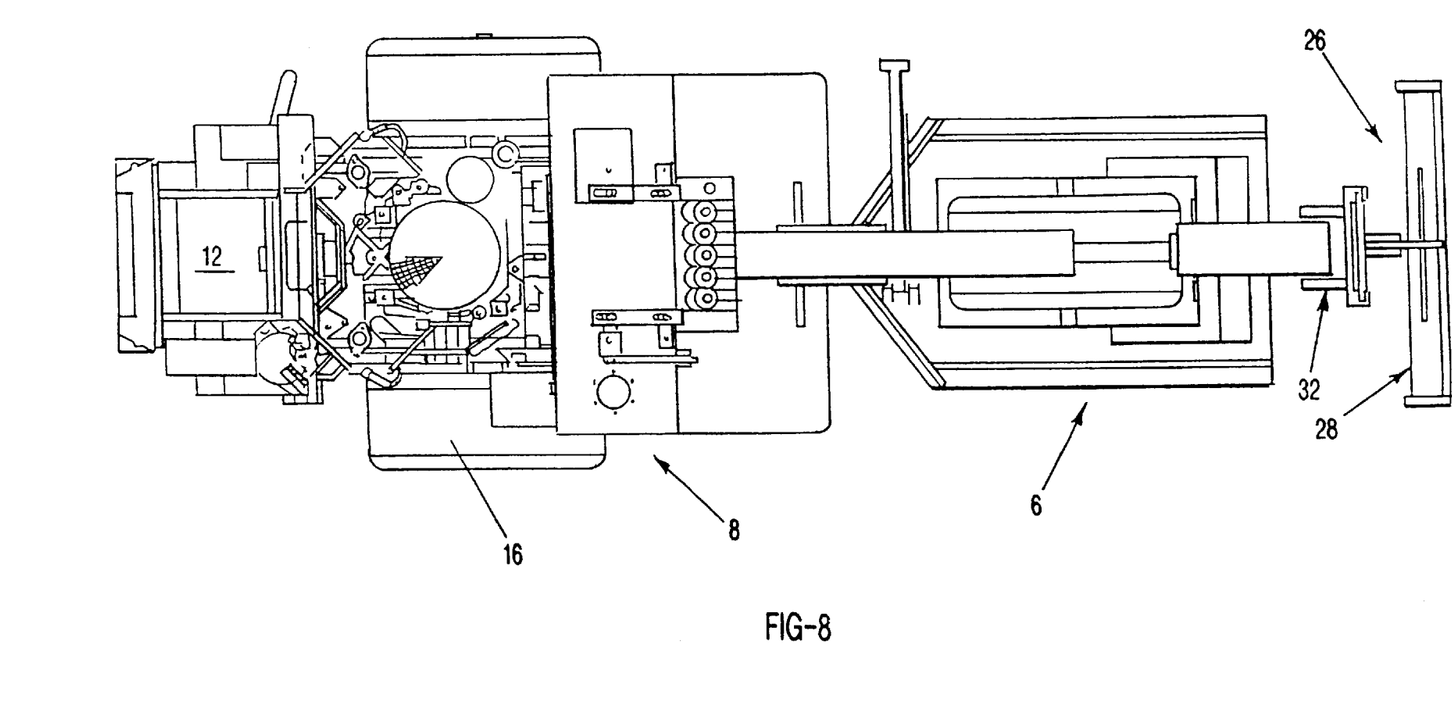
FIG. 8 is a top view of the insertion showing the lateral plow means.

The machine 6 may also be used to pull one or more auxiliary plows for laying lateral lines of pipe or cable. The auxiliary plow will be used to pull lateral lines to the main supply line while the main supply line is being laid by machine 6. The main plow 6 would act as an anchor for the auxiliary plow, and would pull the auxiliary plow with an auxiliary winch 72 mounted to the main plow and run by the main plow's hydraulic system. The auxiliary plow may have an oscillating straight edge blade 74, driven by an engine 76 on board the auxiliary plow via mechanical linkage. When the laying of the main supply line and the lateral lines is completed, each lateral line can be connected to the main line. The advantage of this approach is increased speed of installation since the main plow machine 6 need not be detached from the main conduit in order to be used to lay the lateral conduit, now need it return, after the main conduit is laid, to the locations where the lateral lines must be laid.

Those familiar with the art will appreciate that the invention may be employed in configurations other than the specific forms disclosed herein, without departing from the essential substance thereof.

For example, and not by way of limitation, although the engine 10 of the preferred embodiment is a gasoline engine, the use of a gasoline engine is not a necessary limitation of the invention; for example, a diesel engine, or an electric motor, could be used instead.

Similarly, although the forward frame assembly 26 and the trailer chassis 22 together constitute a two part chassis for supporting the other components of the machine, with adjustable relative angular orientation as described above, it would of course be possible to employ a machine having a single chassis assembly, without departing from the essential substance of the invention.

And although a multi-function hydraulic system is, in the preferred embodiment, the means for transmitting motive power from the engine 10 to the other active components of the main machine, other means could be used instead, for example clutch mechanisms.

And of course the essential substance of the invention does not require use of the particular means for steering the machine which has been described above; one could instead employ a machine with a steering wheel and steering linkages to the drive wheels, of the kind employed in trucks and other motor vehicles.

Although the preferred embodiment employs drive wheels 16, it would of course be possible to employ a machine instead using caterpillar tracks, for example.

For brevity the term "conduit" is used in the claims as the material to be laid, and it is to be understood that this term is intended to encompass electrical cable, as a conduit for electrical current or signals, as well as pipe for flow of water or other liquid, as a conduit for such liquid.

The scope of the invention is defined by the following claims, including also all subject matter encompassed by the doctrine of equivalents as applicable to the claims.

We claim:

1. A vibratory plow machine, for the operation of simultaneously pulling and inserting a length of a conduit in ground, along an intended direction of travel of said machine which is parallel to an intended direction of travel of said conduit when inserted in said ground, comprising:

(a) a chassis means for mounting other components of said machine;

(b) an engine, securely mounted upon said chassis means;

(c) a power transmission means, securely mounted upon said chassis means and connected to said engine, for transmitting motive power from said engine to other components of said machine;

(d) a plow blade formed of two equal portions, joined together at the bottom of said portions and having a V-shaped configuration of said portions with the bottom of the V-shape being at the juncture of said portions, connected to said chassis means, said blade having a cutting edge oriented in a direction at least substantially parallel to said intended direction of travel of said machine;

(e) a winch means, securely mounted to said chassis means at least substantially at the forward end of said chassis means, for connecting said chassis means to and pulling said chassis means toward a fixed objected located forward of said machine;

(f) an oscillator means securely mounted to said chassis means and connected to said power transmission means and to said plow blade, for producing horizontal as well as elliptical motion of said plow blade, as desired by an operator of said machine, said oscillator means comprising means for selectable linking said power transmission means and said plow blade to alter the motion of said blade and driving means, said driving means including a rotatably powered shaft and an eccentric axle, and said selectable linkage means comprising a first link fixedly mounted to the two blade portions and having at least two vertically spaced-apart, upper and lower, pivot means, a second link having one end rotatably mounted on said eccentric axle and at the opposite end to said lower pivot means, a third link having at least two horizontally spaced-apart, left and right, pivot means, whereby when said first link lower pivot means and said second link pivot means are connected and said first link upper pivot means and said third link left pivot means are connected and said third link right pivot means is connected to said frame, said plow blade oscillates substantially in a horizontal path and when said first link lower pivot means and said second link pivot means are connected and said first link upper pivot means is connected to said left pivot means and said third link right pivot means is connected to said frame, said plow blade oscillates substantially in an elliptical path;

(g) a blade extension means, securely mounted to said chassis means and connected to said power transmission means and to said plow blade, for lowering said plow blade into said ground when beginning said operation and for raising said plow blade upon completion of said operation;

(h) wheel means, securely mounted to said chassis means and connected to said power transmission means, for allowing said machine to roll across said ground under power provided to said wheel means through said power transmission means from said engine; and (i) steering means, securely mounted to said chassis means, for steering said machine as said machine rolls across said ground.

2. An apparatus for simultaneously pulling and inserting a length of conduit in the ground, both for a main line of said conduit and for lateral lines of said conduit branching from said main line, comprising:

(a) a main machine as in claim 1, (b) an auxiliary machine for each of said lateral lines to be inserted, each of said auxiliary machine having a plow blade, said plow blade having a cutting edge pointed substantially toward said main machine; and (c) a winch means mounted on said chassis of said main machine and connected to said power transmission means of said main machine, for pulling said auxiliary machine toward said main machine.

3. A vibratory plow machine, for simultaneously pulling and inserting a length of conduit in the ground, along an intended direction of travel of said machine which is parallel to an intended direction of travel of said conduit when inserted in said ground, comprising:

(a) a chassis;

(b) an engine mounted upon said chassis;

(c) power transmission means mounted upon said chassis and connected to said engine, for transmitting motive power from said engine to other components of said machine;

(d) a plow blade connected to said chassis, said blade having a cutting edge oriented in a direction substantially parallel to said intended direction of travel of said machine;

(e) winch means mounted on said chassis substantially at the forward end of said chassis and connected to said power transmission means for connecting said chassis to and pulling said chassis toward a fixed object located forward of said machine;

(f) oscillator means mounted on said chassis and connected to said power transmission means and to said plow blade for selectably producing substantially horizontal and elliptical motion of said plow blade comprising selectable movable links, one of said links connected at one end to said transmission means and at the other end to said plow blade and a second link connected at one end to said chassis and at the other end to said plow blade; and (g) means mounted on said chassis and connected to said power transmission means for allowing said machine to travel over the ground.

4. The vibratory plow machine of claim 3 additionally including means for raising and lowering said plow blade mounted on said chassis and connected to said power transmission means for initially lowering the plow blade into the ground so that the V-shaped junction of the plow blade is at the desired depth.

5. The vibratory plow machine of claim 3 additionally including means for moving the chassis in a selected direction mounted on the chassis and selected from the group consisting of wheels and tracks.

6. The vibratory plow machine of claim 3 wherein said oscillator means additionally includes means for tilting the plow blade in a longitudinal plane at least during the initial pulling of the length of conduit underground.

* * * * *